US 6,470,580 B1

(12) United States Patent
Ushihara et al.

(10) Patent No.: US 6,470,580 B1
(45) Date of Patent: Oct. 29, 2002

(54) TILT SENSOR (75) Inventors: Masaharu Ushihara, Osaka (JP); Nobuharu Katsuki, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 17 days.

(21) Appl. No.: 09/699,641

(22) Filed: Oct. 30, 2000

(30) Foreign Application Priority Data

Oct. 29, 1999 (JP) .......................... 11-309301

(51) Int. Cl.[7] .............. G01C 9/12; G01C 9/06
(52) U.S. Cl. ............... 33/366.24; 33/391; 324/207.25; 180/282; 200/61.52
(58) Field of Search ................ 33/366.11, 366.24, 33/366.25, 366.26, 368, 391, 397, 401, 402; 324/207.13, 207.25; 340/436, 440, 429; 200/61.45 R, 61.48, 61.52, 61.53; 280/734, 735; 180/282

(56) References Cited

U.S. PATENT DOCUMENTS

| | | | | |
|---|---|---|---|---|
| 3,564,171 A | * | 2/1971 | Hammond | 200/61.52 |
| 3,678,750 A | * | 7/1972 | DiNoia et al. | 73/313 |
| 3,719,887 A | * | 3/1973 | Shimuzu et al. | 324/171 |
| 4,016,535 A | * | 4/1977 | Dinlocker | 340/52 |
| 4,186,609 A | * | 2/1980 | Baermann | 73/497 |
| 4,580,136 A | * | 4/1986 | Kitamura et al. | 340/825.31 |
| 4,700,479 A | * | 10/1987 | Saito et al. | 33/366 |
| 4,811,492 A | * | 3/1989 | Kakuta et al. | 33/366 |
| 4,866,379 A | * | 9/1989 | Odawaga et al. | 324/207 |
| 4,885,535 A | * | 12/1989 | Odawaga et al. | 324/207 |
| 4,894,921 A | * | 1/1990 | Barlow | 33/265 |
| 4,910,459 A | * | 3/1990 | Odawaga et al. | 324/207.13 |
| 5,033,013 A | * | 7/1991 | Kato et al. | 364/561 |
| 5,299,456 A | * | 4/1994 | Steiner | 73/308 |
| 5,450,049 A | * | 9/1995 | Bachmann | 335/205 |
| 5,623,766 A | * | 4/1997 | Ruck et al. | 33/561 |
| 5,920,046 A | * | 7/1999 | Takagi | 200/61.48 |
| 5,955,714 A | * | 9/1999 | Reneau | 200/61.52 |

FOREIGN PATENT DOCUMENTS

| | | |
|---|---|---|
| DE | 0768513 A2 | 4/1997 |
| JP | 61-148320 | 7/1986 |
| JP | WO99/28705 | 6/1999 |
| JP | WO99/30110 | 6/1999 |

* cited by examiner

Primary Examiner—Diego Gutierrez
Assistant Examiner—Tania Courson
(74) Attorney, Agent, or Firm—RatnerPrestia (57) ABSTRACT The pendulum assembly comprises a permanent magnet disposed in the vicinity of a pendulum, a U-shaped yoke by which most of the magnetic flux of the permanent magnet is gathered and passes through, and a rotation shaft. The direction of axis of the rotation shaft is parallel to the direction of magnetic poles of the permanent magnet. Eddy current brakes are inserted into the spaces between one of the magnetic poles of the permanent magnet and one of the ends of the yoke, and between the other magnetic pole the magnet and the other end of the yoke. This construction achieves a more compact and shorter tilt sensor which is resistant to disturbances such as geomagnetism and other magnetic fields and vibrations.

10 Claims, 11 Drawing Sheets

TILT SENSOR

BACKGROUND OF THE INVENTION

1. Field of the Invention

The present invention relates to a tilt sensor which detects the tilt angle of vehicles and industrial machines.

2. Description of the Related Art

In recent years, air bags which inflate in accidents such as head-on and side collisions have been widely used as a safety mechanism for vehicles. In such an accident, a vehicle may roll over. Therefore, a tilt sensor which detects such rolling movements and operates the safety mechanism can be effective.

Figure 21:
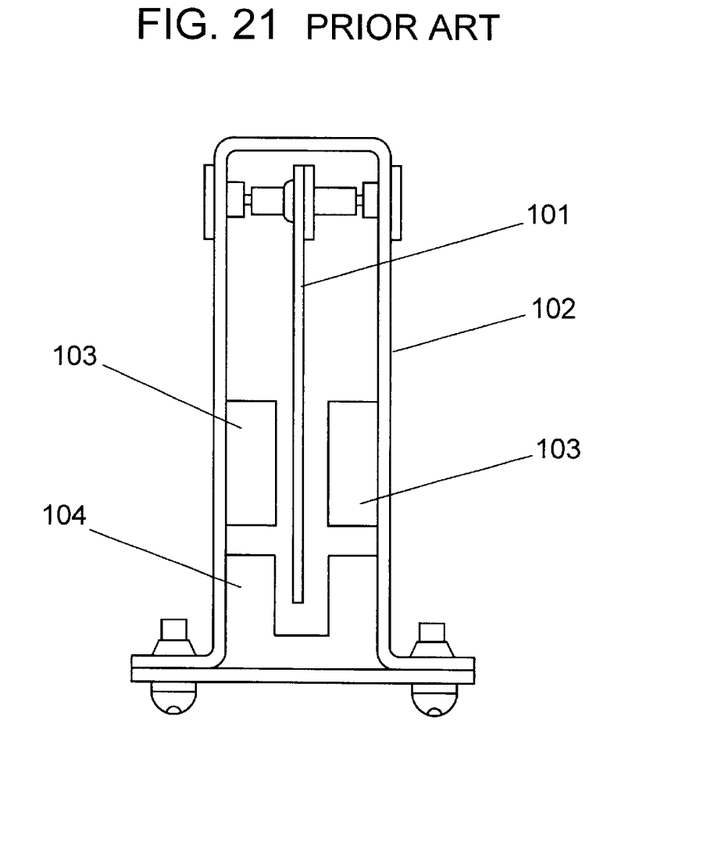
FIG. 21 is a block diagram showing the conventional tilt sensor as Prior Art.

A conventional tilt sensor is disclosed in the Japanese Laid-open Patent No. S60-154108. FIG. 21 shows a construction of a conventional tilt sensor. An angle of a plate-type pendulum 101 relative to substrate 102 changes according to tilt angle of a vehicle. Tilt angle is detected by sensing whether or not light passes through a optical interrupter 104 facing slits provided around the periphery of the pendulum 101. On the surfaces of the substrate 102 is magnet 103. The pendulum 101 turns in a direction transverse to the magnetic flux of the magnet 103. When the pendulum 101 turns at a speed of V, an eddy current is generated by an electromotive force in a direction perpendicular to the rotation direction of the pendulum 101. The eddy current applies a force relative to the speed of V to the pendulum 101 in a direction opposite to its rotation direction. This force functions as a braking force and stabilizes the rotation of the pendulum 101.

The tilt sensors installed in vehicles such as a car needs to be able to switch on and off an electric current of almost 10A flowing in an inflator in order to detect dangerous tilt angle of a car which result in a rollover and to inflate a side air bag. Since the tilt sensors are installed inside a control unit, they need to be compact, and rotate smoothly without being unduly affected by external vibrations.

The foregoing conventional tilt sensor, however, requires amplification of detected signal because the level of detected signal is low. Thus, it requires more printed circuit boards to amplify the signal, resulting in lower reliability. Moreover, its rotation tends to be affected by the diameter of the rotation shaft and the center of the gravity of the pendulum. Furthermore, an optical interrupter needs to be disposed around the periphery of the pendulum. These structural limitations has restricted further down-sizing and reduction in height.

SUMMARY OF THE INVENTION

The present invention aims at providing a more compact and reliable tilt sensor which can be installed in vehicles to solve the foregoing problems.

The tilt sensor of the present invention comprises the following elements:

(a) a base mounted on a fixed body;
(b) a pair of supporting members disposed on the base;
(c) a pendulum assembly;
(d) an eddy current brake fixed to the base; and
(e) reed switches fixed to the base at the location outside the rotation trail of the pendulum assembly.

The pendulum assembly comprises the following elements:

(a) a rotatable pendulum made with non-magnetic material, integrally formed with a rotation shaft which is supported in between the pair of supporting members;

(b) magnetic flux generating means fixed in the vicinity of the periphery of the pendulum, and the direction of whose magnetic poles is parallel to the rotation shaft; and (c) a yoke approximately U-shaped, fixed to the pendulum. Either end of the U-shape yoke faces a magnetic pole of the magnetic flux, generating means. The reed switches open and close based on the magnetic flux generated by the magnetic flux generating means which operates according to the rotation of the pendulum assembly.

DETAILED DESCRIPTION OF THE PREFERRED EMBODIMENTS

With reference to the accompanying drawings, the preferred embodiments of the present invention are described below.

The First Preferred Embodiment

All of the same components in FIG. 1A~FIG. 18 are denoted with the same reference numbers.

Figure 1A:
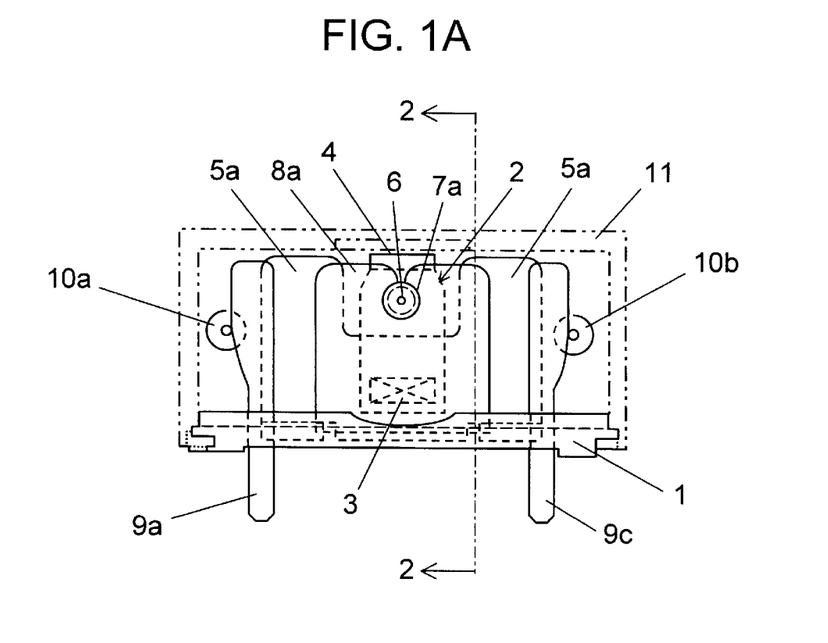
FIG. 1A is a front view of a tilt sensor according to a first preferred embodiment of the present invention.
Figure 1B:
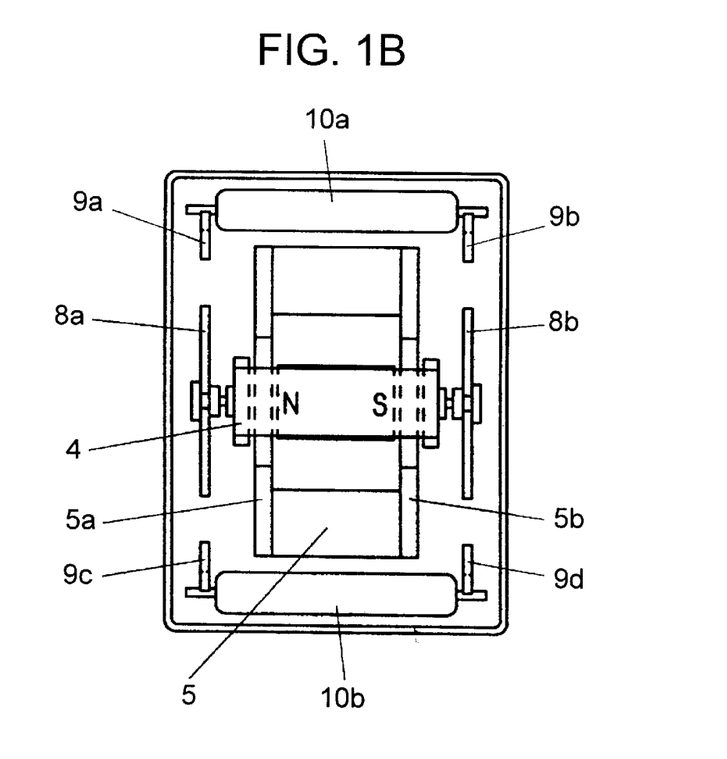
FIG. 1B is a top plane view of a tilt sensor according to the first preferred embodiment of the present invention.
Figure 2:
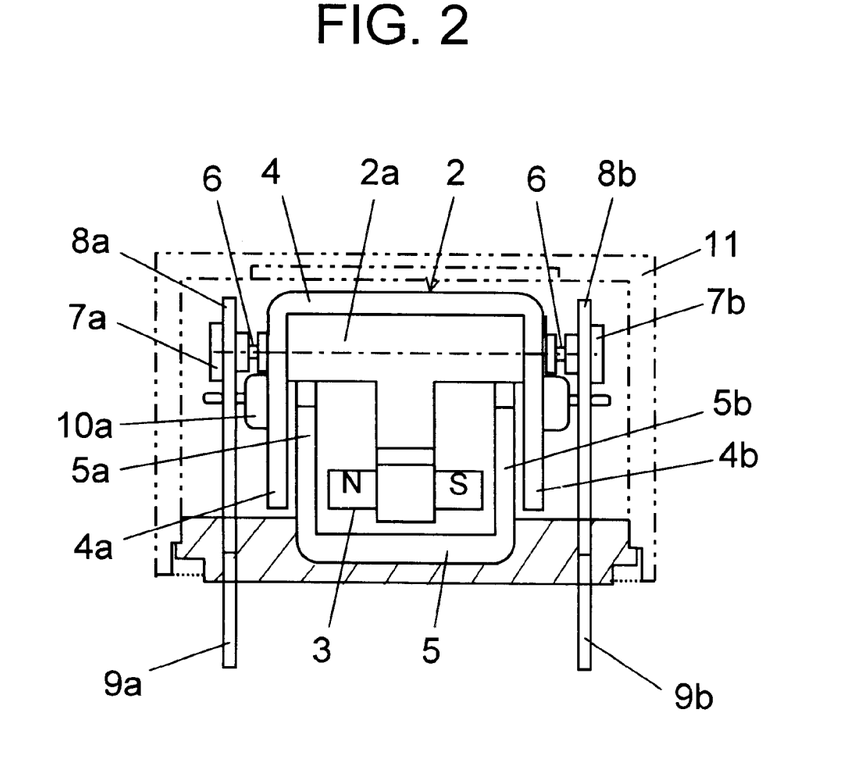
FIG. 2 is a cross sectional view of the tilt sensor according to the first preferred embodiment of the present invention.
Figures 3, 4:
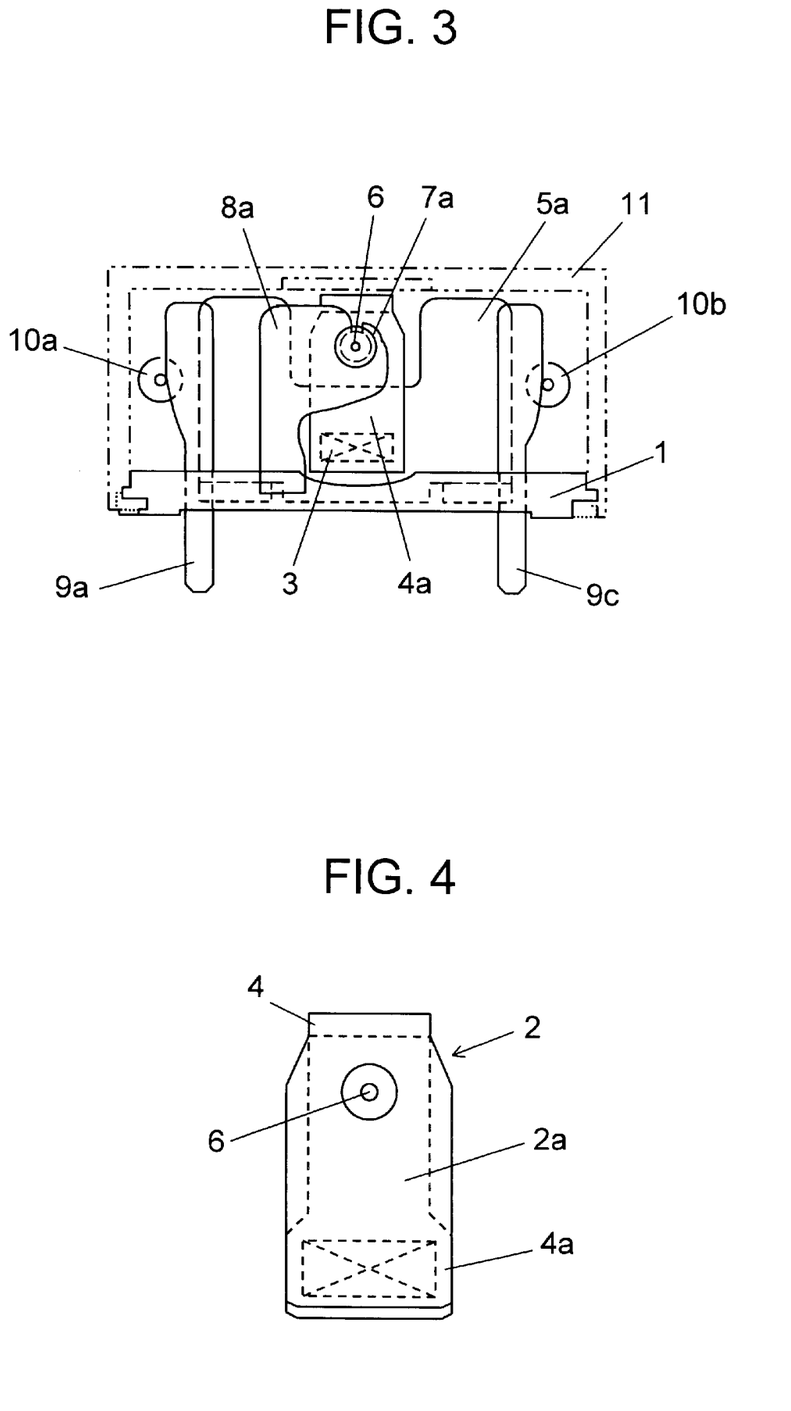
FIG. 3 is a partially broken front view of the tilt sensor according to the first preferred embodiment of the present invention.
FIG. 4 is a front view of a pendulum assembly according to the first preferred embodiment of the present invention.

FIG. 1A is a front view showing the tilt sensor of this embodiment whose lid is removed, FIG. 1B is a top plane view of the tilt sensor, and FIG. 2 is a side view. FIG. 3 is a front view which is partially broken so that it clearly shows the order relationships of the components.

As shown in FIGS. 1A~3, the tilt sensor of this embodiment comprises the following elements:

a) a base 1 mounted on a fixed body such as a vehicle;
b) a pendulum assembly 2;
c) an eddy current brake 5, including ends 5a and 5b;
d) bearings 7a and 7b;
e) supporting members 8a and 8b which support the bearings 7a and 7b;
f) terminal electrodes 9a, 9b, 9c and 9d; and
g) reed switches 10a and 10b.

A casing 11 is shown by a chain line.

The pendulum assembly comprises a pendulum 2a, a permanent bar magnet 3 as a magnetic flux generating means, a yoke 4 through which the magnetic flux of the permanent magnet 3 passes, and a rotation shaft 6 of the pendulum 2a. The eddy current brake 5, the supporting members 8a and 8b, and the terminal electrodes 9a, 9b, 9c and 9d are integrally formed with the base 1.

Figure 5:
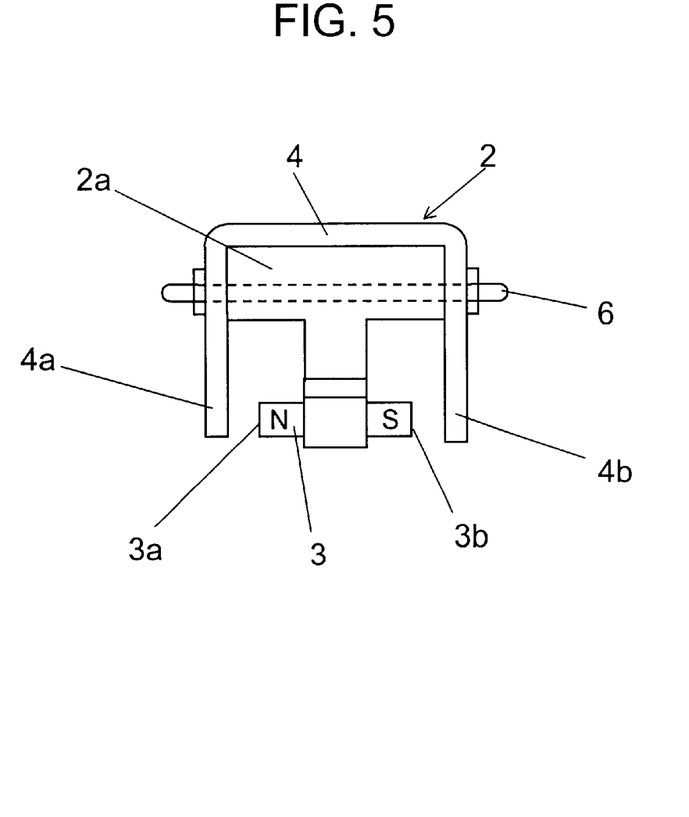
FIG. 5 is a side view of the pendulum assembly according to the first preferred embodiment of the present invention.

FIGS. 4 and 5 respectively show front and side views of the pendulum assembly 2. The pendulum 2a is made of a non-magnetic material such as resin which can be formed with ease. The pendulum 2a, the permanent magnet 3, the about U-shaped yoke 4 and the rotation shaft 6 are integrally formed. The permanent magnet 3 is disposed in the vicinity of the periphery of the about T-shaped pendulum 2a which can rotate around the rotation shaft 6. The permanent bar magnet 3 is disposed parallel to the rotation shaft 6. In other words the direction of its magnetic poles is parallel to the rotation shaft 6. The U-shaped yoke 4 made of a plate folds around the permanent magnet 3 in a manner both ends 4a and 4b of the yoke 4 face pole faces 3a and 3b located at both ends of the permanent magnet 3 while maintaining some space between them.

The rotation shaft 6 is supported by the bearings 7a and 7b disposed in the pair of supporting members 8a and 8b. Thus, the permanent magnet 3 and the yoke 4 composing the pendulum assembly 2 rotate integrally.

Figure 6:
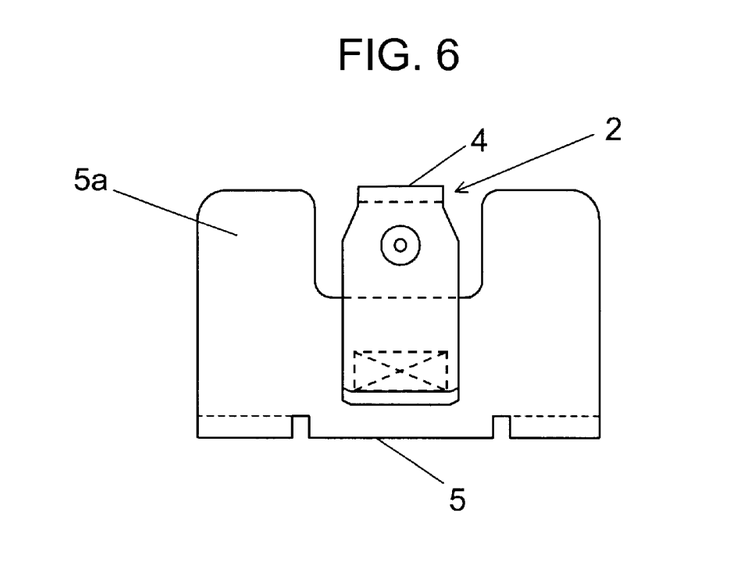
FIG. 6 is a front view illustrating the relationship between the pendulum assembly and the eddy current brake according to the first preferred embodiment of the present invention.
Figure 7:
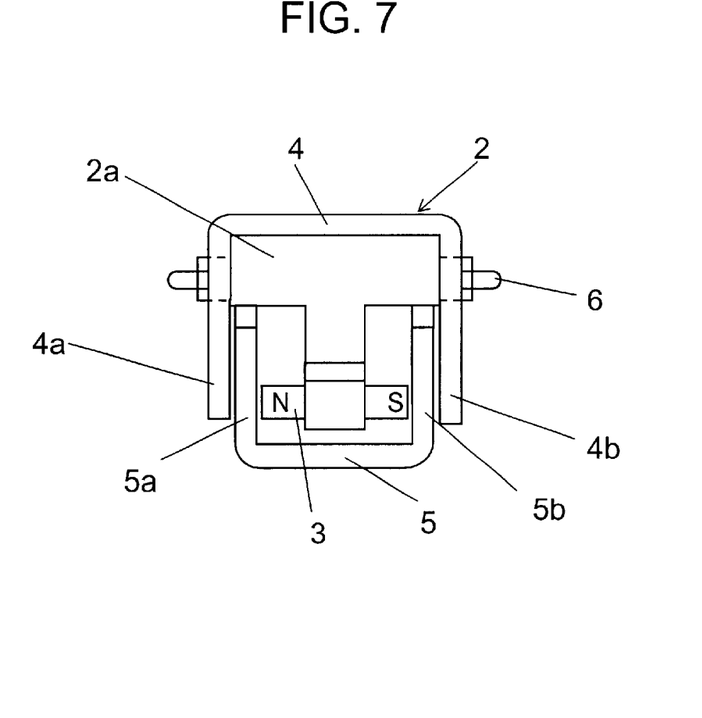
FIG. 7 is a side view illustrating the relationship between the pendulum assembly and the eddy current brake according to the first preferred embodiment of the present invention.

FIGS. 6 and 7 are respectively front and side views illustrating relationship between the pendulum assembly and the eddy current brake.

Figure 8:
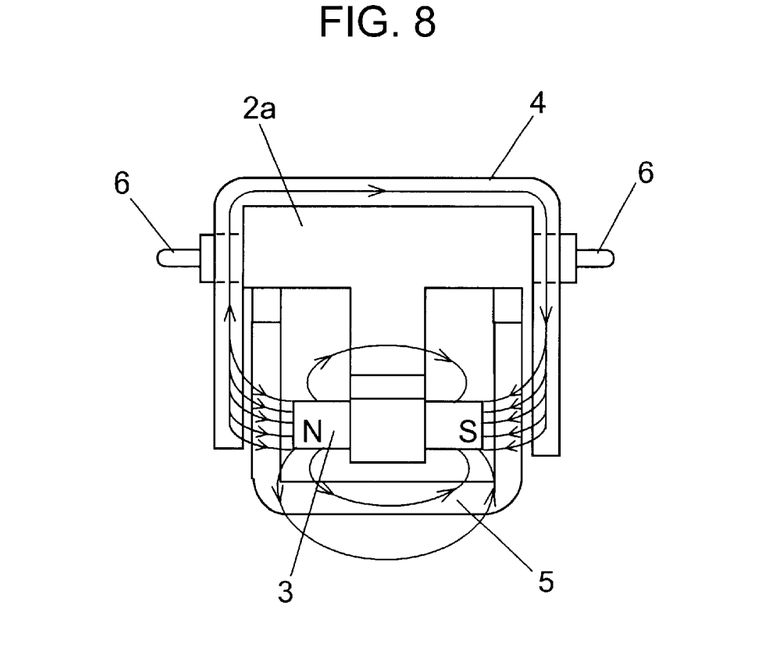
FIG. 8 is a front view showing the distribution of the magnetic flux between the pendulum assembly and the eddy current brake according to the first preferred embodiment of the present invention.
Figure 13:
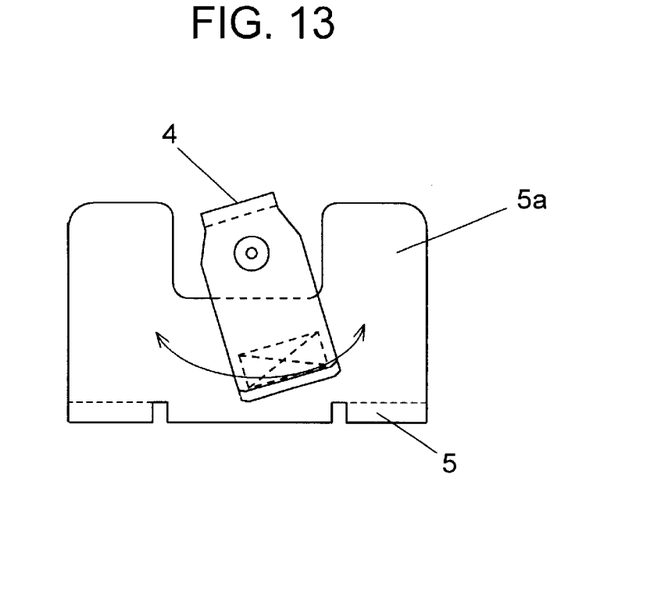
FIG. 13 is a front view illustrating the relationship in the relative motion between the pendulum assembly and the eddy current brake.

As shown in FIGS. 6 and 7, ends 5a and 5b of the eddy current brake 5 whose cross section is U-shaped, are respectively inserted into the spaces between the pole face 3a and the end 4a of the yoke 4, and between 3b and 4b. The eddy current brake 5 is made of non-magnetic material with a high conductivity such as copper or aluminum. The yoke 4 is made of a material with a high magnetic permeability. As shown in FIG. 8, although part of the magnetic flux coming out of the N-pole of the permanent magnet 3 passes through the air and enters the S-pole, most of the magnetic flux passes through the yoke 4. Most of the magnetic flux which passes through the yoke 4 goes though the eddy current brake 5. As a consequence, as shown in FIG. 13, when the pendulum assembly 2 and the eddy current brake 5 move relatively to each other, an eddy current is generated according to their relative speed. Thus, the pendulum assembly is braked by the eddy current, and its relative speed slows down. The magnetic flux travels through the air outside of the yoke 4 and closes the contact points of the reed switches 10a and 10b when the permanent magnet 3 nears them.

Figure 11:
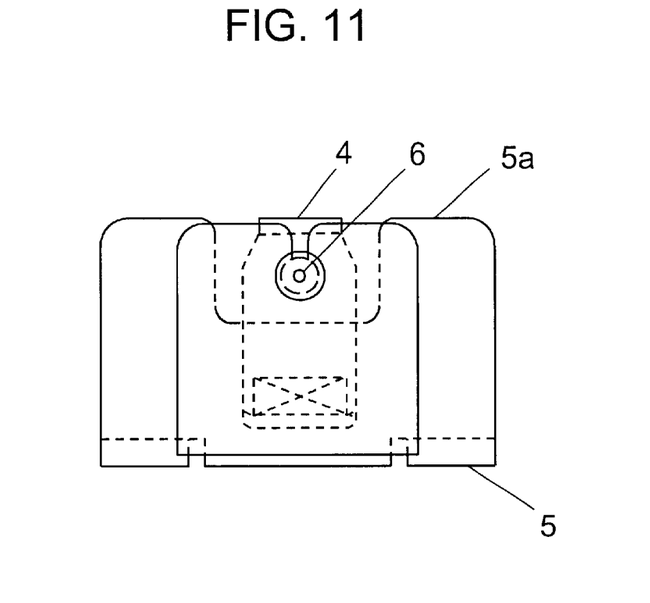
FIG. 11 is a front view illustrating the relationship among the pendulum assembly, the eddy current brake, bearings and the supporting members.
Figure 12:
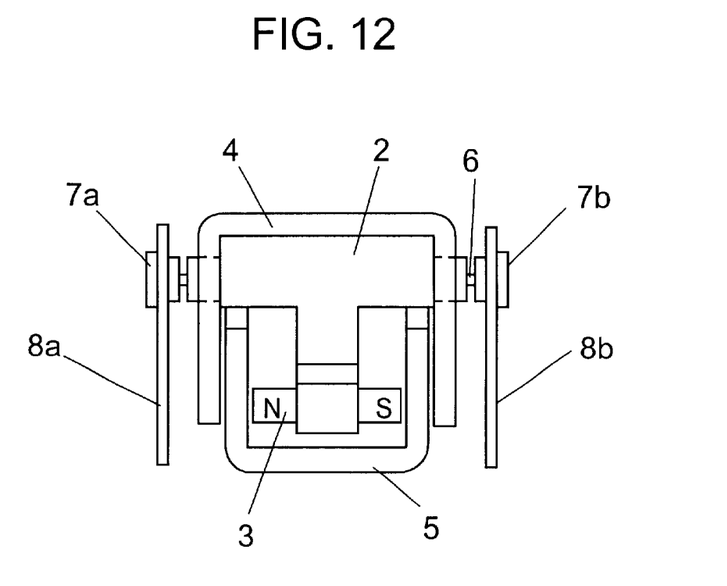
FIG. 12 is a side view illustrating the relationship among the pendulum assembly, the eddy current brake, the bearings and the supporting members.

In FIGS. 11 and 12, the rotation shaft 6 is supported by the bearings 7a and 7b which are supported by the supporting members 8a and 8b.

The following is the description of the operation of the first preferred embodiment of the present invention.

Figure 14:
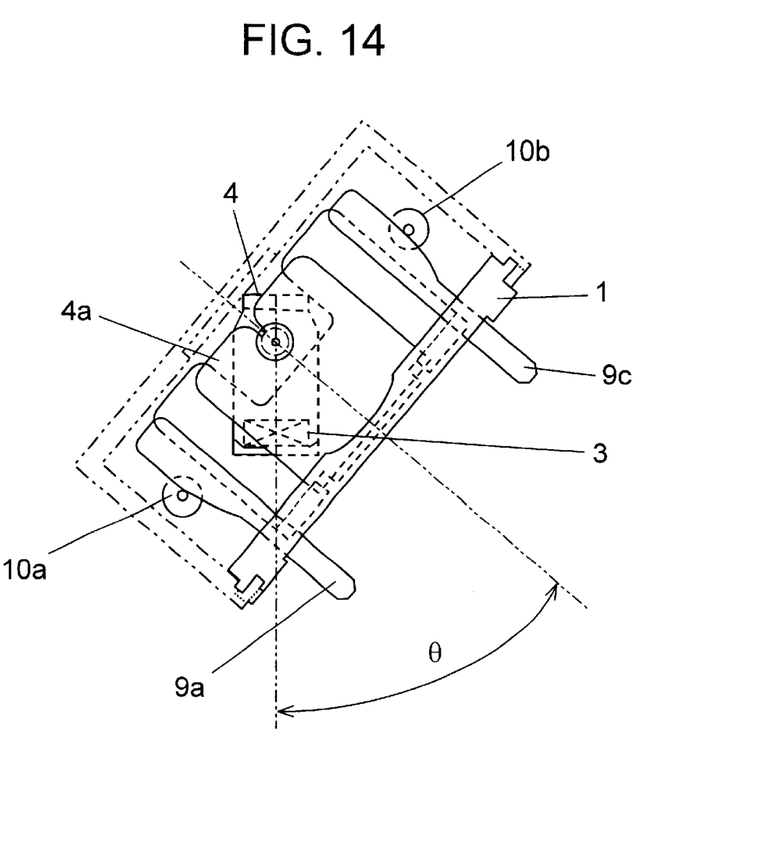
FIG. 14 is a front view in which the tilt sensor is rotating counterclockwise in accordance with the first preferred embodiment of the present invention.
Figure 16:
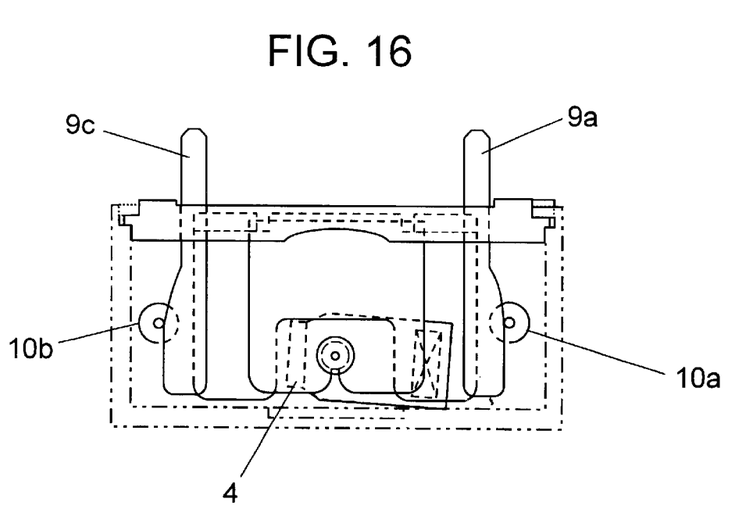
FIG. 16 is a front view in which the tilt sensor continues to rotate counterclockwise until the vehicle rolls over, in accordance with the first preferred embodiment of the present invention.

In FIGS. 1A, 1B, 2 and 3, the base 1 is almost horizontal. The permanent magnet 3 of the pendulum assembly 2 is far enough from the reed switches 10a and 10b that they are in the open position. As shown in FIG. 14, when the attitude of the object such as a vehicle into which the sensor is installed, is tilted counterclockwise by an angle θ, the permanent magnet 3 comes close to the reed switch 10a. Consequently, the reed switch is moved to the closed position by the magnetic force of the permanent magnet 3, electrically connecting the terminal electrodes 9a and 9b. In this way, for example, an air bag can be inflated. An required value of θ for this to trigger this mechanism is, for example, 50 degrees. As shown in FIG. 16, when the object tilts and rolls over, the reed switch 10a remains closed.

Figure 15:
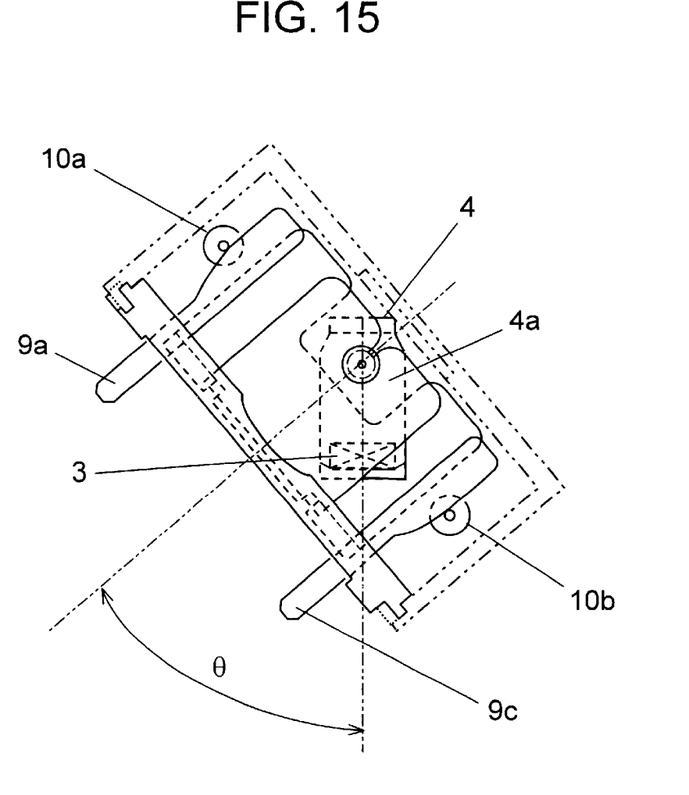
FIG. 15 is a front view in which the tilt sensor is rotating clockwise in accordance with the first preferred embodiment of the present invention.

As shown in FIG. 15, when the object tilts clockwise, the same mechanism operates. In this case, instead of the reed switch 10a, the reed switch 10b closes.

Any material which generates magnetic force including an electromagnet can be used for the permanent magnet 3. To achieve a tilt sensor which can precisely detect dangerous angular attitude in a wide range of temperatures using the permanent magnet 3, it is effective to use rare earth magnets with good temperature properties, in particular a samarium-cobalt magnet.

The eddy current brake 5 prevents the reed switches 10a and 10b from closing by mistake when the pendulum assembly 2 swings over the angle θ due to the vibration applied on the vehicle while it is driving normally.

Since most of the magnetic flux passes through the yoke 4, the eddy current brake 5 applies effective braking force. As the braking force is larger, a heavier pendulum assembly can be employed. The magnetic route is specified by the yoke, the amount of leakage flux can be reduced until a level by which the reed switches 10a and 10b are closed.

Figure 9:
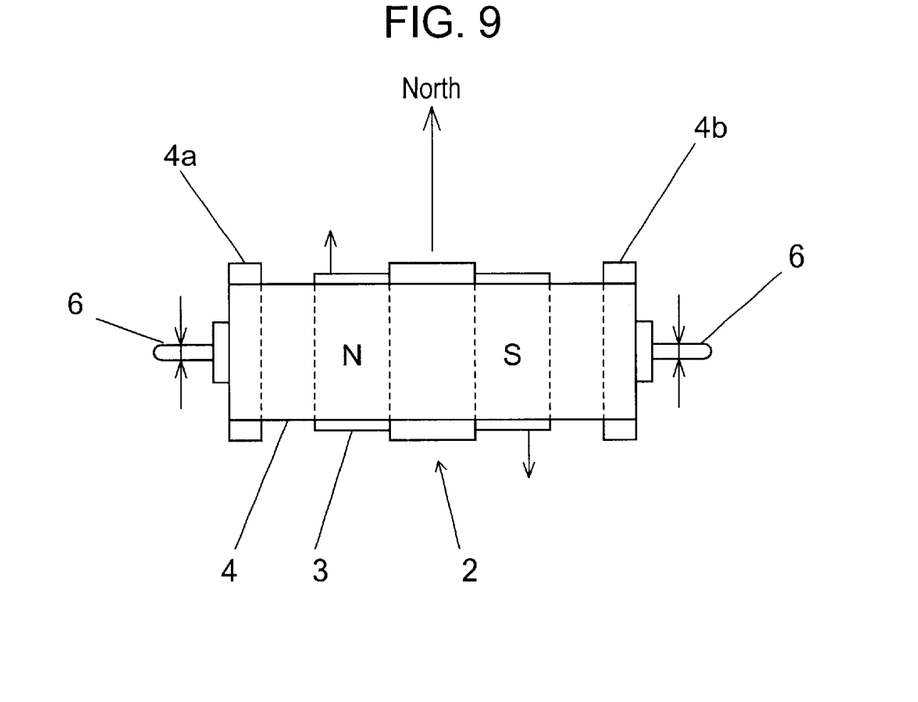
FIG. 9 shows an influence of the geomagnetic moment on the pendulum assembly according to the first preferred embodiment of the present invention.
Figure 10:
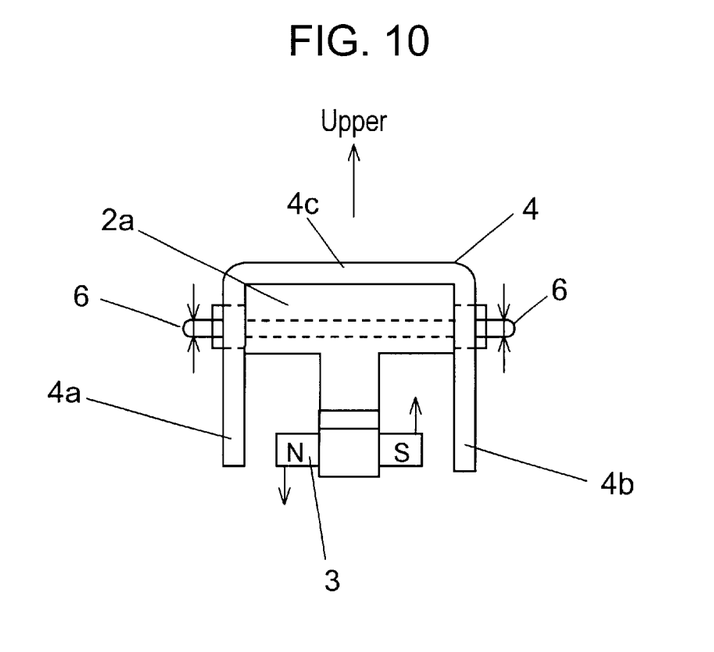
FIG. 10 shows an influence of the geomagnetic moment on the pendulum assembly according to the first preferred embodiment of the present invention.

According to the first preferred embodiment, the longitudinal direction of the permanent bar magnet 3 is parallel to the direction of the rotation shaft 6 of the pendulum 2a. Therefore, as shown in FIG. 9, when viewing the pendulum assembly 2 from the top, the rotation moment generated by the horizontal intensity of the geomagnetism and the permanent magnet 3 is supported by the bearings at both ends of the rotation shaft 6. As shown in FIG. 10, the rotation moment generated by the vertical intensity of the geomagnetism and the permanent magnet 3 is also supported by the bearings at both ends of the rotation shaft 6. In other words, the force generated by the geomagnetism and the permanent magnet 3 does not affect the rotation of the pendulum assembly at all. The yoke 4 functions as a shield which shields the external magnetic field from the side and top of the tilt sensor. Thus, the tilt sensor is not easily affected by external ferromagnetic bodies or magnetic field.

Figure 17:
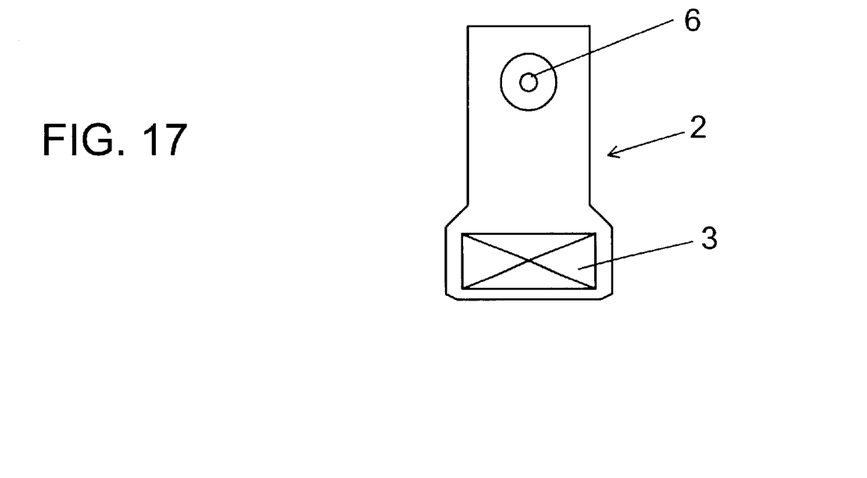
FIG. 17 is a front view showing the shape of magnet of the pendulum assembly in accordance with the first preferred embodiment of the present invention.
Figure 18:
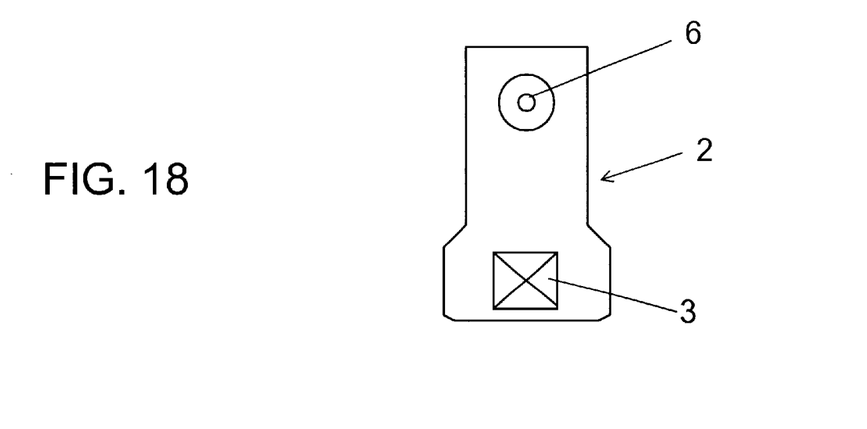
FIG. 18 is a front view showing the shape of magnet of the pendulum assembly of the tilt sensor.

As shown in FIG. 17 shows, according to the first preferred embodiment, the bar magnet 3 has a rectangular cross section. The magnet 3 is integrally formed with the pendulum 2a in such a manner that its longitudinal side is parallel to the direction of movement of the pendulum 2a. In FIG. 18, a cross section of the magnet is square. In comparison with FIG. 18, it is clear that when the cross section of the magnet 3 is rectangular, the distance between the shaft 6 and the magnet 3 is longer. Due to this, relative speed between the permanent magnet 3 and the eddy current brake 5 becomes larger when the pendulum assembly 2 swings, thereby increasing the brake torque applied by the eddy current. If the rectangle is too thin, the magnetic force is reduced, thus the range of the thickness is limited. The effective proportion of the longer side to the shorter side of the rectangle is within the range of 1:1.5~4.0, preferably 1:2.0~3.5.

In general, the smaller the radius of the pendulum becomes, the smaller the torque of the eddy current brake. To solve this problem, the value of SL=GL−TL is set at 2 mm or less, preferably 1 mm or less to effectively use the magnetic flux: where (GL) is the size of the space between the pole face of the magnet 3 and the end of the yoke 4 facing the pole face; (TL) is the thickness of the brake member disposed in the space. Considering the sizes of the components and assembly tolerance, SL is set at not less than 0.1 mm. By setting the value of SL within the range of 0.1~20 mm (preferably 0.1~1 mm), the magnetic flux can be used effectively, thereby achieving a large eddy current brake force. This allows the radius of the pendulum assembly 2 to be smaller, lowering the height of the tilt sensor itself. In other words, the tilt sensor can be shorter.

In the first preferred embodiment, the eddy current brake is U-shaped. The reason for this is to use the magnetic force of both of the N and S poles effectively. If brake forces are not required, use of magnetic force of only one of the poles is sufficient.

The Second Preferred Embodiment

Figure 19:
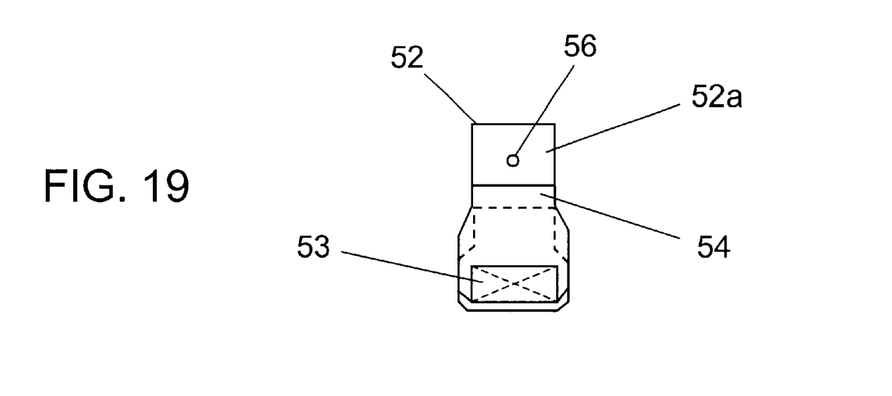
FIG. 19 is a front view showing a pendulum assembly in accordance with a second preferred embodiment of the present invention.
Figure 20:
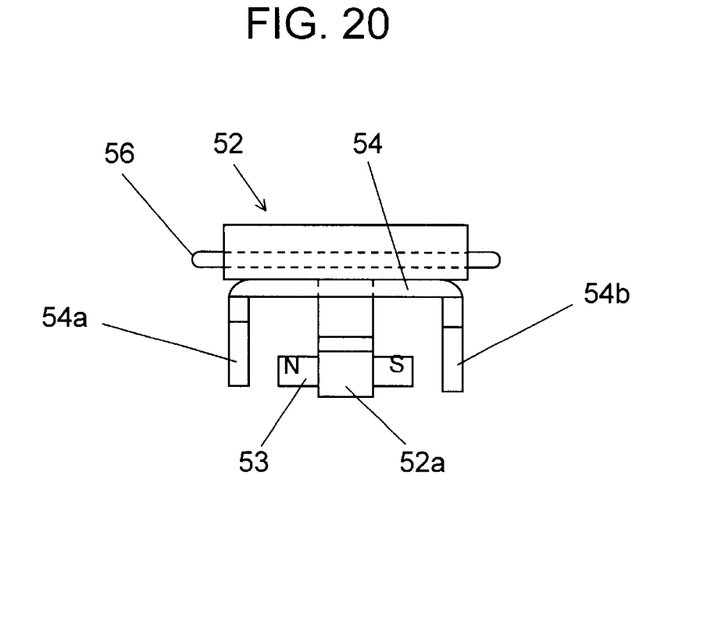
FIG. 20 is a side view showing a pendulum assembly in accordance with the second preferred embodiment of the present invention.

FIGS. 19 and 20 are respectively front and side views of a pendulum assembly of a tilt sensor in accordance with the second preferred embodiment of the present invention. The same components are denoted with the same reference numbers.

A pendulum assembly 52 of this embodiment comprises a rotation shaft 56 which is integrally formed with a pendulum 52a, and a permanent magnetic 53 functions as a magnetic flux generating means which is integrally formed with a about U-shaped yoke 54 in a rotatable manner. As shown in FIG. 20, in the second preferred embodiment, the rotation shaft 56 is disposed outside the yoke 54.

By constructing in a manner shown in FIG. 20, for example, the height of the pendulum assembly 52 can be shortened by an amount equal to the thickness of the top plate of the yoke 54 thereby lowering overall height of the tilt sensor. Moreover, the magnetic route becomes shorter, thus the magnetic flux is enhanced. Furthermore, inertia moment of the pendulum assembly can be reduced.

The pendulum assembly of this embodiment is constructed in the same manner as the first preferred embodiment. In this embodiment, however, the pendulum 52a which is integrally formed with the rotation shaft 56, is formed with the permanent magnet 53 functions as a magnetic flux generating means and the U-shaped yoke 54 integrally so that the pendulum 52a can rotate. Therefore, the same function and effect as the first preferred embodiment can be achieved.

What is claimed is:

1. A tilt sensor comprising:
    (a) a base;
    (b) a pair of supporting members disposed on said base;
    (c) a pendulum assembly comprising;
        (i) a rotatable pendulum made from a non-magnetic material, wherein said pendulum is integrally formed with a rotation shaft supported in between said pair of supporting members and said rotation shaft partially penetrates said pendulum;
        (ii) a magnetic flux generating means fixed to said pendulum in the vicinity of a periphery of said pendulum, and a direction of magnetic poles of said magnetic flux generating means is parallel to said rotation shaft; and
        (iii) a yoke approximately U-shaped fixed to said pendulum and rotatable with said pendulum, wherein either end of said yoke faces the magnetic pole of said magnetic flux generating means;
    (d) an eddy current brake fixed to said base, said eddy current brake is disposed in at least one of spaces between the end of said yoke and the magnetic pole of said magnetic flux generating means; and
    (e) a reed switch fixed to said base at a location outside a rotation trail of said pendulum assembly, and said reed switch opens and closes based on flux of said magnetic flux generating means according to rotation of said pendulum assembly, said eddy current brake brakes said magnetic flux generating means according to a relative motion between said magnetic flux generating means and said eddy current brake, and said reed switch is closed by magnetic flux when said magnetic flux generating means is adjacent to said reed switch.

2. The tilt sensor of claim 1, wherein said magnetic flux generating means and said pendulum are disposed inside of said U-shaped yoke.

3. The tilt sensor of claim 1, wherein said yoke is made of a plate material.

4. The tilt sensor of claim 1, wherein said magnetic flux generating means is a permanent magnet.

5. The tilt sensor of claim 4, wherein a cross section of said permanent magnet in a direction of magnetic poles sectioned at a right angle is approximately rectangular, and a longitudinal direction of the rectangular is parallel to a direction of swinging of said pendulum.

6. The tilt sensor of claim 4, wherein a proportion of longitudinal and transverse directions of rectangular cross section of said permanent magnet is 1:1.5~4.

7. The tilt sensor of claim 4, wherein said permanent magnet is a samarium-cobalt magnet.

8. The tilt sensor of claim 1, wherein said eddy current brake is disposed along a rotation trace of the pole face of said magnetic flux generating means.

9. The tilt sensor of claim 1, wherein a length obtained by subtracting a thickness of said eddy current brake from a size of a space between the end of said yoke and the pole face of said magnetic flux generating means is 0.1~2 mm.

10. The tilt sensor of claim 1, wherein a cross section of said eddy current brake is approximately U-shaped.

* * * * *